March 16, 1937. W. NANFELDT 2,074,128
WOVEN FRICTION LINING
Original Filed April 29, 1931

INVENTOR
WILLIAM NANFELDT.
BY ATTORNEY

Patented Mar. 16, 1937

2,074,128

UNITED STATES PATENT OFFICE 2,074,128

WOVEN FRICTION LINING

William Nanfeldt, Clifton, N. J., assignor to World Bestos Corporation, Paterson, N. J., a corporation of Delaware Application April 29, 1931, Serial No. 533,631
Renewed July 11, 1936

6 Claims. (Cl. 28—1)

This invention relates to woven friction material adapted to be used as brake lining in automotive vehicles and is especially adapted for brakes where heavy duty service is required as in trucks and buses.

One of the objects of the invention is to provide a brake lining which is flexible so as not to be easily broken when bent but which also has a compact friction surface having a high wear factor.

Another object of the invention is to provide a brake lining in which the impregnated frictioning material is more uniformly distributed throughout the cross-section thereof.

A still further object of the invention is to provide a brake lining in which the braking surface is woven from hard dense wear resisting yarn while a more flexible and softer yarn is used as a binder to hold together layers of the hard yarn.

Other objects and objects relating particularly to the method of manufacturing and assembling the various yarns in the construction of the lining will be apparent as the description thereof proceeds.

One embodiment of the invention has been illustrated in the accompanying drawing in which.

In the manufacture of brake lining by weaving asbestos yarn into a fabric and then impregnating the fabric with frictioning material it has been found that a hard dense asbestos yarn has the highest wear factor. When this yarn is woven very compactly into a fabric there is danger that the frictioning material with which it is desired to impregnate the fabric will not penetrate all the way to the center and hence the cross-section of the completed brake lining may not be altogether uniform. Such a brake lining also has a tendency to break when bent too abruptly as the hard yarn when compactly woven will not give readily when the fabric is bent. I have found that the life of such a fabric lining may be greatly increased by using a different type of yarn to bind the fabric layers together. This yarn is a softer more porous yarn and considerably more flexible and is preferably woven into the fabric so that a very small portion of it falls on the braking surface.

Figure 4:
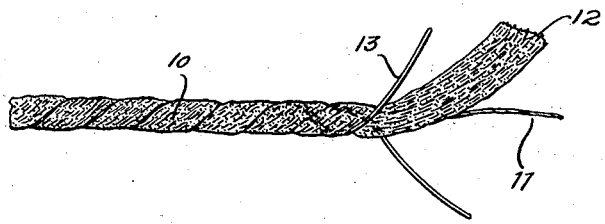
Fig. 4 is an enlarged perspective view of another of the yarns.

In Fig. 4 one form of the hard compact yarn is illustrated. In this figure the yarn 10 comprises a core 11 of cotton string surrounded by a strip 12 of asbestos paper which is formed around the core in a suitable machine and then wrapped to hold it in place with a pair of wires 13 preferably made of brass and about .008 of an inch in diameter. The brass wires are wrapped tightly about the asbestos paper so as to cut into it and then the yarn is twisted which draws the wires toward the center of the yarn and away from the outer surface so that when the yarn is completed the outer surface is composed of the asbestos material and small portions only of the wires are visible.

One form of this yarn together with a machine for manufacturing it is described and illustrated in my application entitled "Yarn forming machine", Serial No. 202,796 filed July 1, 1927. The asbestos paper is composed of short asbestos fibres which are thoroughly cleaned to remove grit and abrasive material and then mixed with starch, sulphide wood pulp, and graphite until a uniform homogeneous mixture is obtained. This mixture is placed in a paper making machine where it is felted together in the form of a thin asbestos paper, the starch acting as a bond for the fibres while the sulphide wood pulp increases its strength. The graphite acts as a lubricant in the finished lining and also increases the coefficient of friction of the lining when it becomes wet. The paper is then cut into strips of the proper dimension for the given size of yarn and then goes to the twisting machine where it is formed around the core of cotton string. The core is preferably moistened with a 5% solution of glycerine in water before entering the machine so that it will in turn moisten the strip as it is formed around it thereby making a compact yarn, the brass wires holding the paper firmly against the cotton string and reinforcing the whole yarn. After the wires are wrapped around the yarn it is again twisted to further compact it to increase its strength. The yarn may be used in a loom with any desirable type of weave to form a fabric for use in brake linings as described in the first mentioned application.

Figure 3:
Fig. 3 is an enlarged perspective view of a portion of one of the yarns used.

The present invention contemplates the use of two or more layers of such fabric held together with binder threads of a different type of yarn. This yarn 14 is shown in Fig. 3 and comprises several asbestos fibre rovings 15 twisted together with a pair of brass wires 16 of about .008 of an inch in diameter. In making this yarn long asbestos fibres are used which are properly cleaned and then mixed with about 20% of medium stapled cotton. This material is then carded on a carding machine similar to that used in a process for making woolen yarns. The fibres are placed on the carding machine and formed into rovings of the proper size to form one ply of finished yarn. Next each roving is twisted on a mule to the proper number of twists per inch and about three strands of the twisted rovings are then placed on a twister and twisted together with the wires to form the finished yarn, it being preferably arranged so that the wires form the core of the yarn.

Figure 1:
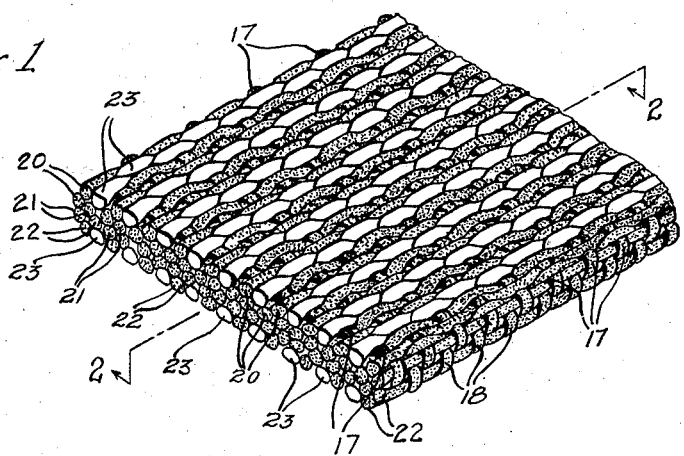
Fig. 1 is a perspective view of a completed woven fabric brake lining prior to impregnation with the lubricating materials.
Figure 2:
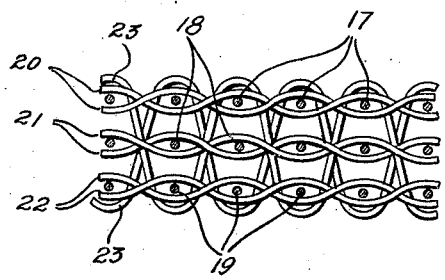
Fig. 2 is a diagrammatical sectional view showing the preferred weave in making the brake lining and taken on the line 2—2 of Fig. 1.

In making up the fabric the felted yarn 10 is used for both the woof and warp threads and the carded yarn 14 is used for binders holding several layers of the fabric together. In Fig. 2 a three-ply fabric is diagrammatically shown in which the woof threads 17 are formed of the felted yarn 10 as are also the warp threads 20, 21, and 22 of the three layers of fabric. Additional binder threads 23 formed of the carded yarn 14 are used to pass over the top of one of the woof threads 17 of the upper ply, down through the three layers and under the next woof thread 19 of the lowermost ply and so on back and forth through the three thicknesses so as to bind them close together and into one unit as illustrated in Fig. 1. These binder threads 23, formed of the carded yarn 14, are preferably positioned one on each side of the pairs of warp threads 20, 21, and 22 so that the resultant fabric has one of the binder threads 23 then a pair of the felted warp threads 20 and then another pair of binder threads 23 throughout the width of the lining material.

In weaving the brake lining as described above the woof threads are woven wet so as to assist in collapsing the warp threads and allowing for the packing of these threads close together resulting in a greater density. After the weaving is completed moisture is removed by drying.

The lining is then calendered so as to equalize the tensions on the warp threads and binders and to also increase the density and correct many of the variations in the weaving.

The finished fabric may be impregnated with any desired material for increasing its effectiveness as a brake lining. I prefer to use for this purpose a mixture of the following materials:

| | Per cent |
|---|---|
| Gilsonite | 4.2 |
| Stearin pitch | 4.2 |
| Water gas tar | 45.4 |
| Coal tar | 12.8 |
| Coal tar solvent | 12.3 |
| Linseed oil | 1.3 |
| China-wood oil | .7 |
| Mexican petroleum | 8.7 |
| Bakelite resin | 10 |
| | 99.6 |

After being treated with this material the brake lining is cured by heat to form the finished product.

From the above it will be seen that a compact brake lining fabric is provided in which the braking surface is composed principally of the hard felted yarn while the several layers of the fabric are held together by means of the binder of carded yarn. This increases the flexibility of the completed product as the different layers may move upon each other without breaking the threads thereof while the binder threads being formed of the carded yarn will permit movement without rupture. As the carded yarn is woven transversely through the lining very little of it lies on the friction surface and hence does not interfere with the braking effect. When the fabric is impregnated with the treating material the carded yarn acts as a wick to absorb the material and carry it through the fabric from one side to the other so that the impregnating may be done in a much more uniform manner than is possible with the hard yarns alone. The result is a strong flexible brake lining having a high coefficient of friction and a high wear factor which will outlast ordinary brake lining made of a single type of yarn.

Modifications may be made in the construction of the lining fabric as well as the yarns used for making it and I do not, therefore, desire to limit myself to the specific structure shown and described except as such limitations occur in the appended claims.

What I desire to claim and secure by Letters Patent is:

1. In a woven friction material a plurality of layers of fabric formed of hard short fibre asbestos yarn and a plurality of binder threads formed of soft, asbestos containing, long fibre yarn holding said fabric layers together, said soft yarn being absorbent relative to the hard yarn whereby impregnating fluids may be freely carried into the body of the lining.

2. In a woven friction material a plurality of layers of fabric formed of hard short fibre felted asbestos yarn and a plurality of threads formed of soft long fibre carded yarn running longitudinally of said fabric and through said layers and spaced at regular intervals across said fabric to hold said layers together, the combination of yarns forming a friction lining having a greater density than is obtainable from either type yarn used alone.

3. In a woven friction material a plurality of warp and woof threads woven together to form a layer of friction fabric, a plurality of warp and woof threads woven together to form a second layer of friction material, the threads of both said first and second layer being formed of short asbestos fibres felted into a thin sheet of paper and formed around a core and reinforced by a winding of wire therearound, a plurality of strands passing up and down through said layers to hold said layers together, said strands containing long asbestos fibres carded and twisted together with a plurality of wires to reinforce them, the long asbestos fibres being soft and absorbent relative to said felted fibres, whereby impregnating material is readily carried into the interior of the friction fabric and a dense structure is formed.

4. In a woven friction material a plurality of layers of felted asbestos friction fabric, binders formed of a carded asbestos containing yarn having longer fibres than the yarn of said fabric layers and being softer and more absorbent than said yarn, an impregnant within said material, said binder serving to unite the fabric layers and to transmit the impregnant throughout the lining.

5. A woven friction lining comprising a plurality of plies, each ply being formed of warp and woof threads composed of short fibre felted asbestos yarn and a plurality of binding threads holding said plies together in a compact mass comprising long fibre, carded, cotton and asbestos yarn, said carded yarn imparting flexibility, permitting higher density and serving as a carrier of impregnating fluid to the lining whereby the life of the lining is increased.

6. In a woven friction material, a plurality of layers of fabric formed of relatively hard and densely woven asbestos containing yarn, a plurality of binder threads formed of relatively soft and absorbent asbestos and cotton containing yarn holding said fabric layers together, and an impregnant permeating said lining, said soft yarn serving as a distributing element for said impregnant.

WILLIAM NANFELDT.